June 10, 1930.  W. SCHEPPMANN  1,763,482
SCANNING DEVICE
Filed May 31, 1929
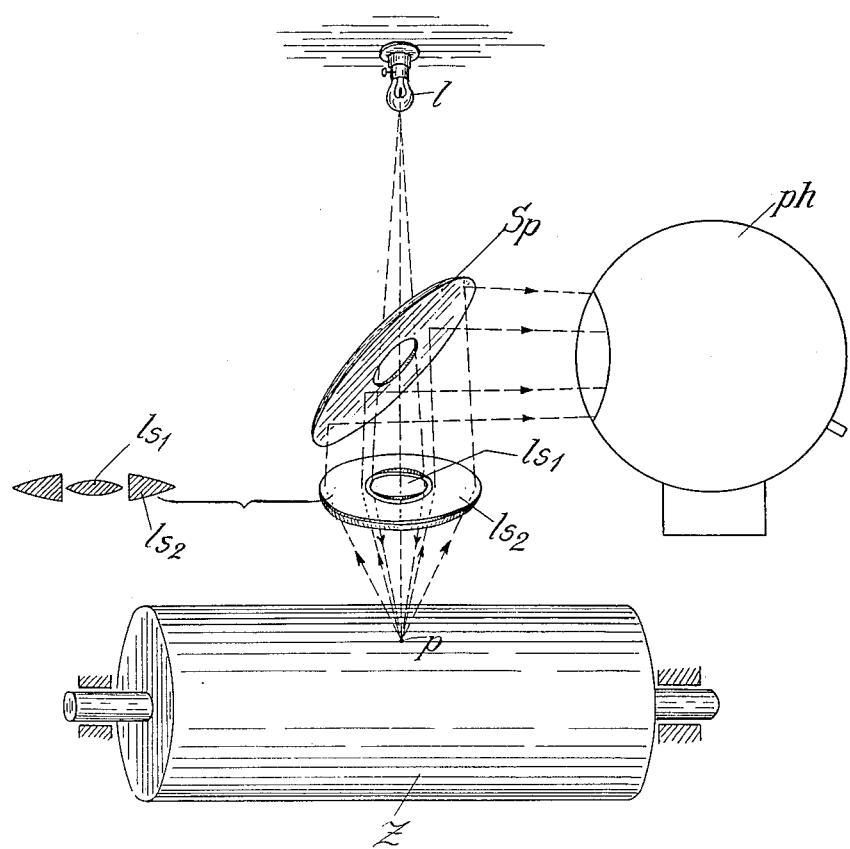
Inventor:
Wilhelm Scheppmann
by Paul D. Schilling
Attorney Patented June 10, 1930

1,763,482

UNITED STATES PATENT OFFICE

WILHELM SCHEPPMANN, OF BERLIN-TEMPELHOF, GERMANY, ASSIGNOR TO C. LORENZ AKTIENGESELLSCHAFT, OF BERLIN-TEMPELHOF, GERMANY

SCANNING DEVICE

Application filed May 31, 1929, Serial No. 367,245, and in Germany June 7, 1928.

The present invention relates to a device which serves the purpose of condensing in a particularly advantageous manner the reflected light and to admit the latter to the light sensitive cell, with picture transmitting apparatus, and the like, operating with reflected light. The reception of the condensed rays of light is effected by means of a standard photo-electric cell. Just in this fact lies the great advantage over known devices, which operate with a special cell perforated in its centre portion. The arrangement according to the present invention also offers the advantage that all the reflected rays instead of only a fraction of the rays of light reflected by the picture element are condensed and caused to act on the said cell. In order to obtain this end according to this invention the rays reflected by the illuminated spot of the picture are condensed by means of a system of perforated annular lenses and the said rays are condensed in the direction of the incident rays of light and concentrated upon a reflecting surface, which will pass the cone of light to the photo-electric cell.

In the drawing one mode of execution of the device according to the invention is shown diagrammatically by way of example.

As shown in the drawing the rays of light emanating from the source of light $l$ are concentrated by means of a system or lenses $l_{s1}$ upon the spot $p$ of the picture on the picture carrying cylinder $z$. The reflected rays impinge upon an annular lens $l_{s2}$, which is perforated in its central portion in order to receive the system of lenses $l_{s1}$ required for the condensation of the rays of light upon the spot of the picture. In the arrangement shown in the drawing the rays are condensed by means of the lens $l_{s2}$ and rendered convergent and then passed to the perforated mirror $Sp$, by means of which they are concentrated upon photo-electric cells $ph$. The advantage of the described arrangement consists on the one hand in that all reflected rays of light are utilized and on the other hand the entire active surface of the photo-electric cells can be utilized. By a corresponding selection of the system of lenses $l_{s2}$ one is at liberty to render the reflected cone of light more or less converging or diverging, for the purpose of exciting the total surface of the photo-electric cell through said cone of light just according to the size of said cell. The mirror $Sp$ need not be made plane as shown in the drawing, but it may also be arched in order to support the effect of the lens $l_{s2}$.

I claim:

1. In a picture scanning apparatus, a picture carrier drum, a source of light above the drum, a photo-sensitive cell, a primary lens disposed in the path of the light beam from the light source for condensing the light rays and projecting a spot of light upon the drum, an annular secondary lens surrounding the primary lens and acting to receive and condense the light rays reflected upwardly from the drum and to project such rays convergently upward therefrom, and a reflector arranged between the source of light and the lenses and having an opening therein to admit passage of the light beam from the source to the primary lens, said reflector being disposed and operating to intercept the reflected light rays from the secondary lens and concentrate the same upon the photosensitive cell.

2. In a picture scanning apparatus, a picture carrier drum, a source of light above the drum, a photosensitive cell arranged at a point between the source of light and the drum and at one side of the vertical plane of the light beam emanating from said source, a primary lens disposed in the path of the light beam from the light source for condensing the light rays and projecting a spot of light upon the drum, an annular secondary lens surrounding the primary lens and acting to receive and condense the light rays reflected upwardly from the drum and to project such rays convergently upward therefrom, and an inclined reflector arranged between the source of light and the lenses and having an opening therein to admit passage of the light beam from the source to the primary lens, said reflector being disposed and operating to intercept the reflected light rays from the secondary lens and project the same laterally upon the photosensitive cell.

3. In a picture scanning apparatus, a picture carrier drum, a source of light above the drum, a photosensitive cell, a primary lens disposed in the path of the light beam from the light source for condensing the light rays and projecting a spot of light upon the drum, an annular secondary lens surrounding the primary lens and acting to receive and condense the light rays reflected upwardly from the drum and to project such rays convergently upward therefrom, and a reflector arranged between the source of light and the lenses and having an opening therein to admit passage of the light beam from the source to the primary lens, said reflector having a concaved surface to intercept the reflected light rays from the secondary lens and concentrate the same upon the photosensitive cell.

In testimony whereof I have affixed my signature.

WILHELM SCHEPPMANN.